Oct. 7, 1930.    A. DOW    1,777,403
POWER TRANSMISSION MECHANISM
Filed July 18, 1928    7 Sheets-Sheet 1

INVENTOR.
Alexander Dow
BY James L. Stewart
ATTORNEY.

Oct. 7, 1930.  A. DOW  1,777,403
POWER TRANSMISSION MECHANISM
Filed July 18, 1928  7 Sheets-Sheet 2

INVENTOR.
Alexander Dow
BY James L. Stewart
ATTORNEY.

Oct. 7, 1930.  A. DOW  1,777,403
POWER TRANSMISSION MECHANISM
Filed July 18, 1928  7 Sheets-Sheet 3
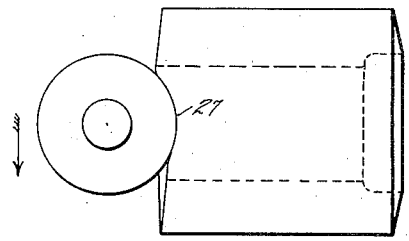
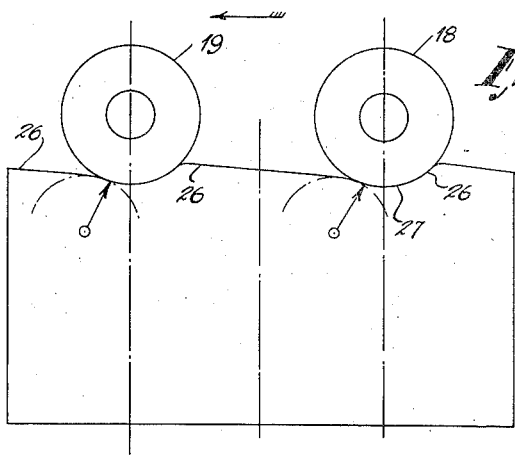
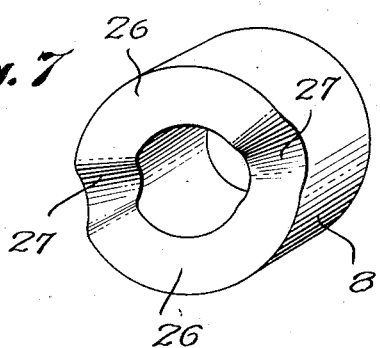
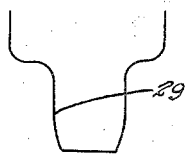
INVENTOR.
Alexander Dow
BY James L. Stewart
ATTORNEY.

Oct. 7, 1930.  A. DOW  1,777,403
POWER TRANSMISSION MECHANISM
Filed July 18, 1928  7 Sheets-Sheet 4
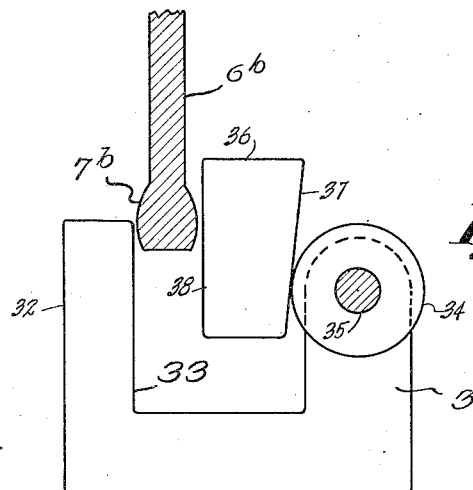
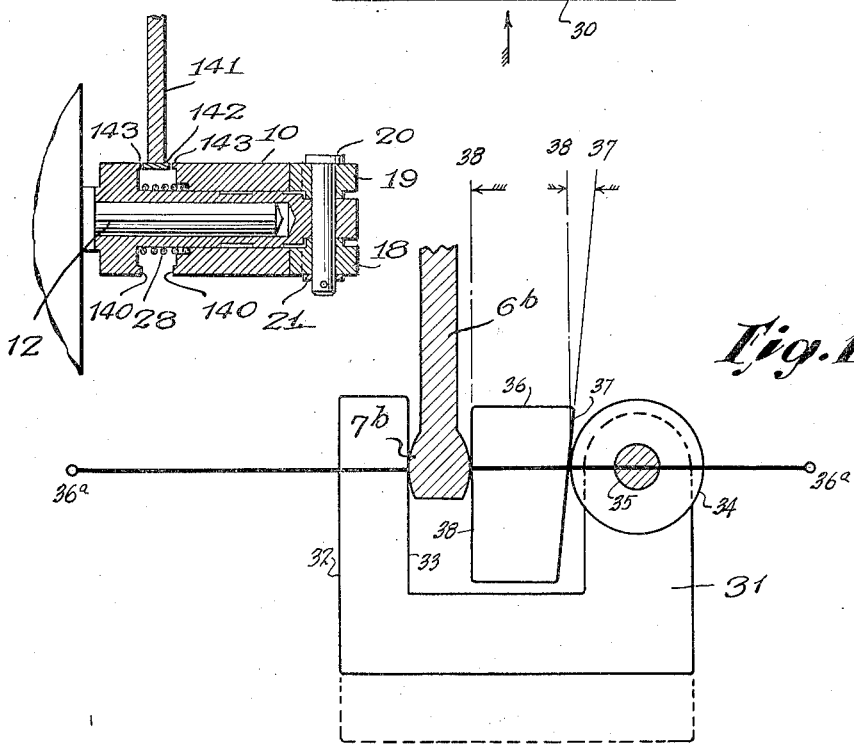
INVENTOR.
Alexander Dow
BY James L. Stewart
ATTORNEY.

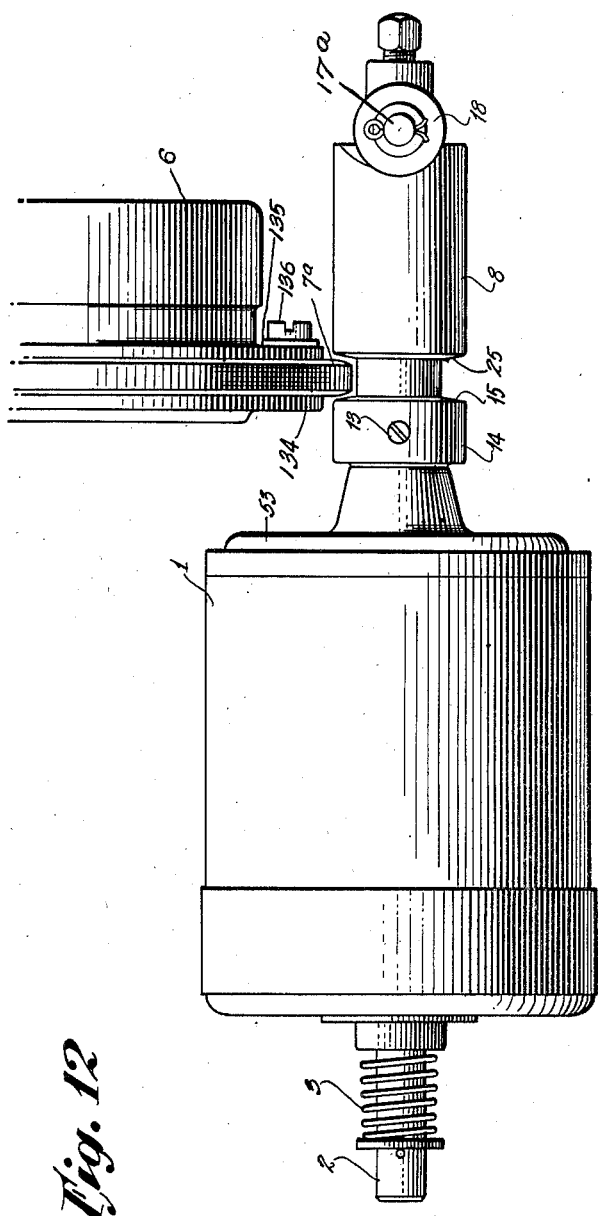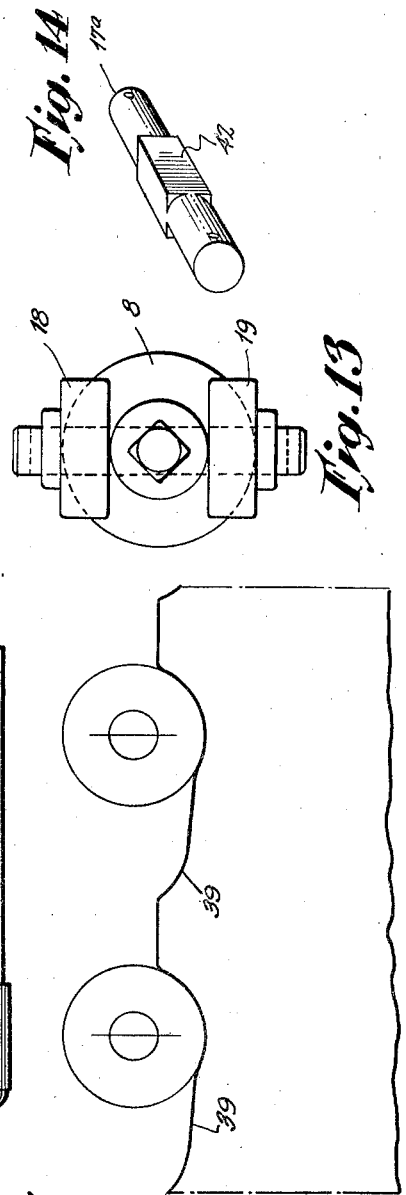

Oct. 7, 1930.  A. DOW  1,777,403
POWER TRANSMISSION MECHANISM
Filed July 18, 1928   7 Sheets-Sheet 6
Fig. 16
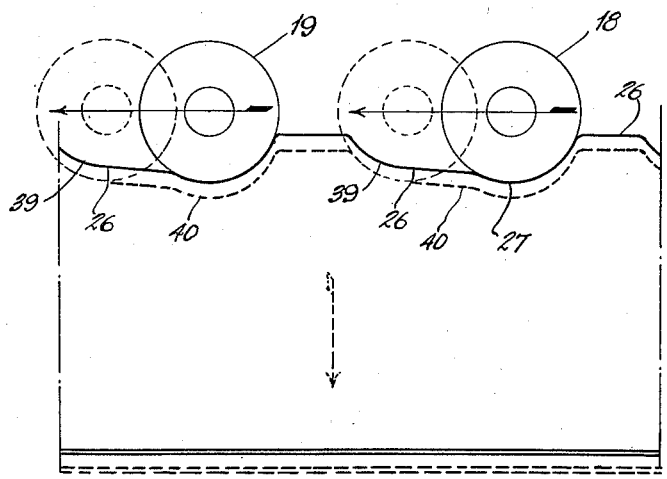
Fig. 17.
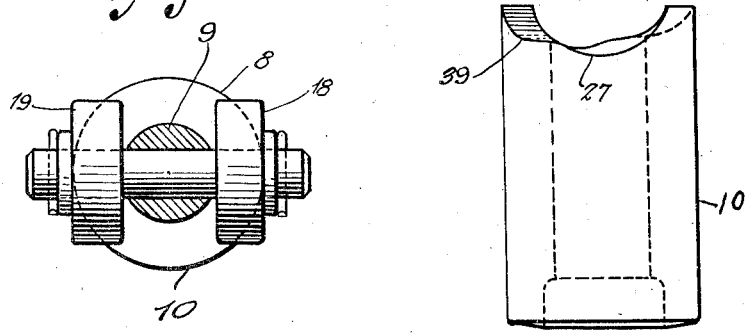
Fig. 18
Fig. 21.
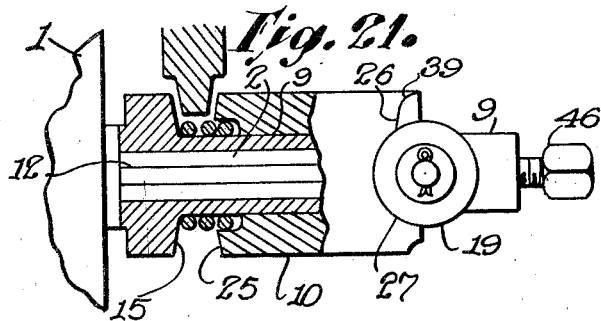
INVENTOR.
Alexander Dow
BY James L. Stewart
ATTORNEY.

Oct. 7, 1930.    A. DOW    1,777,403
POWER TRANSMISSION MECHANISM
Filed July 18, 1928    7 Sheets-Sheet 7
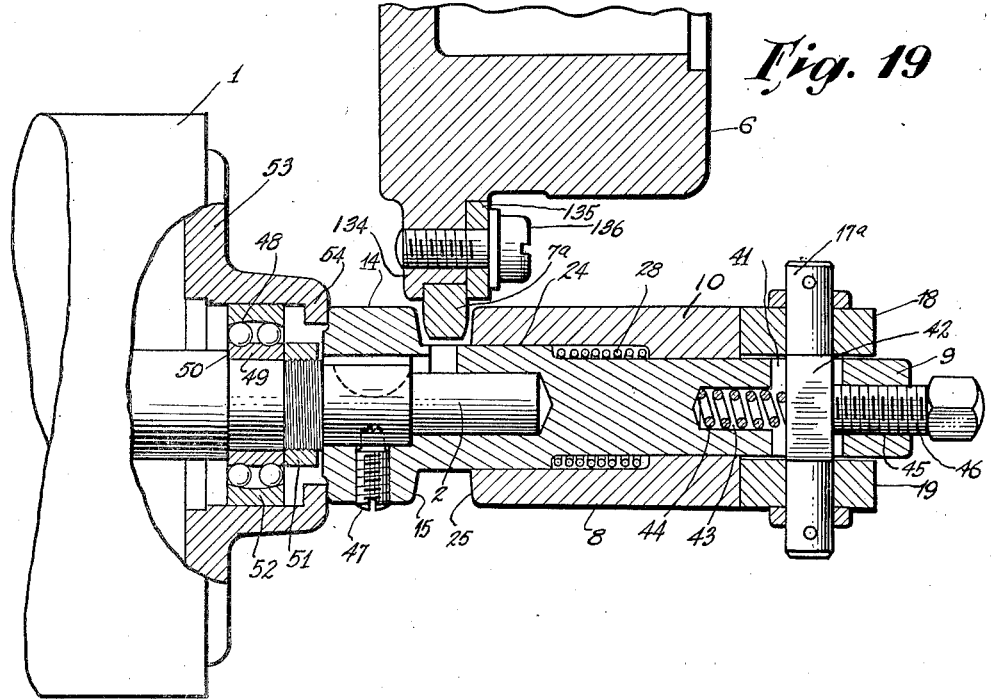
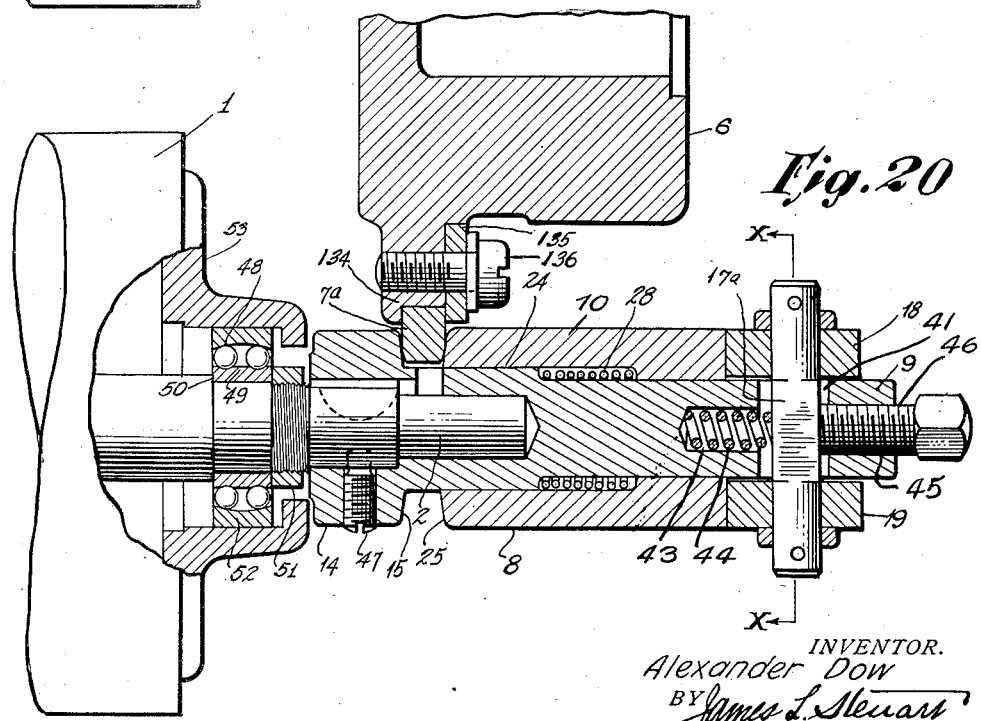
INVENTOR.
Alexander Dow
BY James L. Stewart
ATTORNEY Patented Oct. 7, 1930

1,777,403

UNITED STATES PATENT OFFICE

ALEXANDER DOW, OF NEW YORK, N. Y., ASSIGNOR TO DOW PATENTS HOLDING CORPORATION, A CORPORATION OF DELAWARE

POWER-TRANSMISSION MECHANISM

Application filed July 18, 1928. Serial No. 293,731.

This invention relates to the art of power transmission and control. It has to do particularly with means and mechanisms including the automatic operation of a method for effecting driving engagement between the driving and driven elements, and for disengaging the same.

The invention claimed under this application is an improvement on an invention embodying both apparatus and method described in an application for patent by the same inventor, which application for patent is now pending in the United States Patent Office, the same bearing Serial Number 226,170, filed October 14, 1927.

It is deemed desirable in presenting the present application for patent that the specification and drawings of said pending application be reproduced herein and made part hereof, which taken in connection with additional description, drawings and claims, will fully present the invention covered by this application for patent.

The following is a copy of said application for patent, omitting the claims made in that application.

"This invention relates to the art of power transmission and control. It has to do particularly with means and mechanisms including the operation of a method for accomplishing driving engagement between driving and driven elements. That particular phase of the invention which has to do with the transmission of power through the medium of gripping mechanism described herein may pertain to a variety of uses and purposes. In fact, wherever it is desirable to transmit power through the medium of a driving and a driven element, the principles involving the mechanism of this invention may be employed. It is also applicable for cooperation with devices where the gripping mechanism is so constituted as to cooperate with other mechanisms adapted to loosen the gripping mechainsm and cause the same to be again operative, dependent upon variations in the load carried by the driving element, or it may be associated with devices adapted to engage and release the gripping mechanism under any prescribed conditions. The invention herein disclosed and claimed is intended to be commensurate with any of the various applications to which it may be applied.

One embodiment of said invention will be disclosed in this application as the same pertains to devices for starting internal combustion engines, the same being adapted to cooperate with that class of engine in the first instance to apply the force of a prime mover, such as an electric motor, to operate the device to engage a driven element such as the fly-wheel of a gas motor, and thus to cause said flywheel to rotate in a manner to start the combustion engine in its cycle of operation; and then, as the momentum of the engine exceeds the momentum of the prime mover, the elements involved cooperate to disengage the driving from the driven mechanism by the release of the gripping mechanism interposed, thus permitting the combustion engine to rotate without further cooperation on the part of the prime mover.

Said invention in its broad application and also in its specific application to self starters, is illustrated in the accompanying drawings and described by reference to index numerals, like parts being indicated by like numerals.

Figure 5 is a detail of one of the combined elements, exhibiting the same in association with a roller, with which it is adapted to cooperate.

Figure 6 is a diagrammatic view showing the relation of certain cams and rollers, such diagram illustrating the relation of certain cams and rollers as projected in one plane.

Figure 7 is a perspective view of the element exhibited in Figure 5.

Figure 8 is a diagrammatic illustration of the annular surfaces of a fly-wheel adapted to be interposed between the wall of a gripping mechanism.

Figures 9 and 10 are diagrammatic views introduced for the purpose of illustrating the operation of the gripping elements employed and the cooperative forces involved.

Figure 11 is a vertical section of the starter mechanism, illustrating another form in which the engaging faces of the gripping mechanism may cooperate with corresponding engaging faces carried by the driven element.

As previously stated, a self starter for internal combustion engines must involve means for transmitting power from a driving to a driven element, through the medium of some form of power transmission, and it must also provide for the release of such power transmission connection when the speed of the gas engine exceeds that of the prime mover. The operation of transmitting power from a prime mover operating a driving element to a driven element will first be described, and the releasing operation subsequently disclosed.

Figure 1:
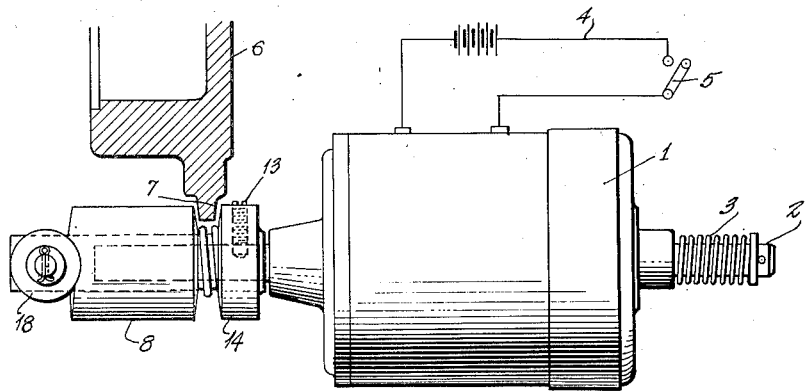
Figure 1 is a side elevation, exhibiting a starter in association with the fly-wheel of a combustion engine, the latter being illustrated in section. Electrical connections are shown in diagrammatic form.
Figure 2:
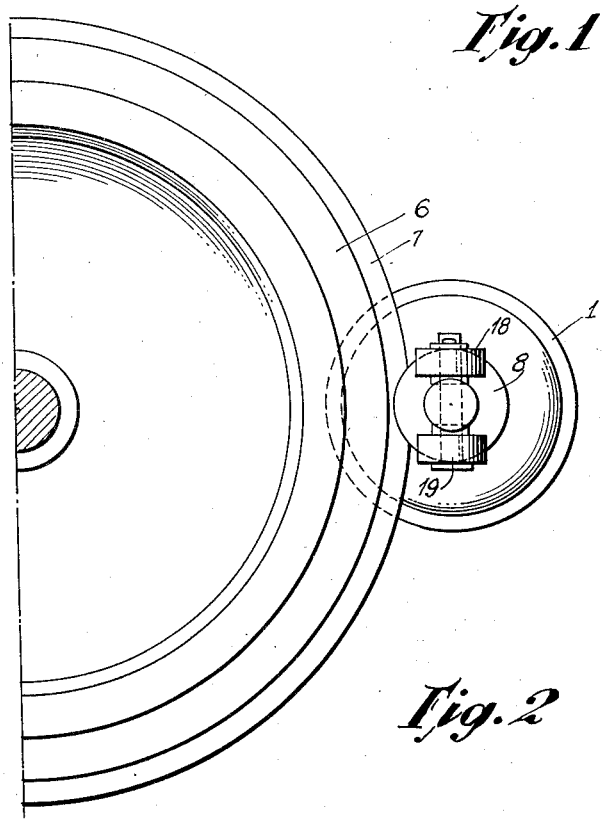
Figure 2 is an end view in elevation of Figure 1.

Referring to Figures 1 and 2, 1 indicates an electric motor, which in this case is employed preferably as a prime mover. 2 is the armature shaft of the motor and 3 a spring interposed to regulate the position of the armature according to well understood electric laws. 4 is an electric circuit, including the motor 1, and controlled by a switch 5. 6, in Figure 1, is a sectional view of the fly-wheel of a combustion engine, while 7 is an annular element formed on the periphery of said flywheel adapted to cooperate with the faces of a gripping mechanism hereinafter to be described. 8 designates generally a gripping mechanism which will be described in detail.

Figure 2 represents an end view of the starter, as associated with the fly-wheel of the combustion engine. 6 is the fly-wheel and 7 the peripheral engaging surface. 1 is the motor and 8 the starter mechanism. The details thereof will be subsequently described.

Figure 3:
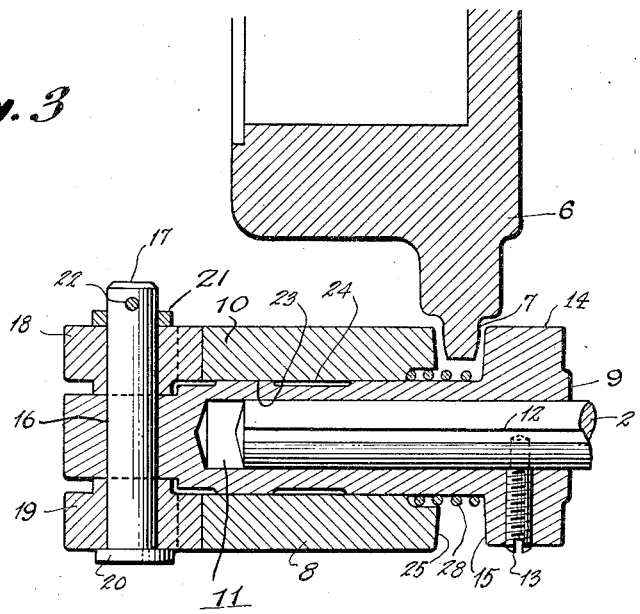
Figure 3 is a vertical section of a specific embodiment of a combustion engine starter, illustrating the same with the gripping mechanism disengaged.
Figure 4:
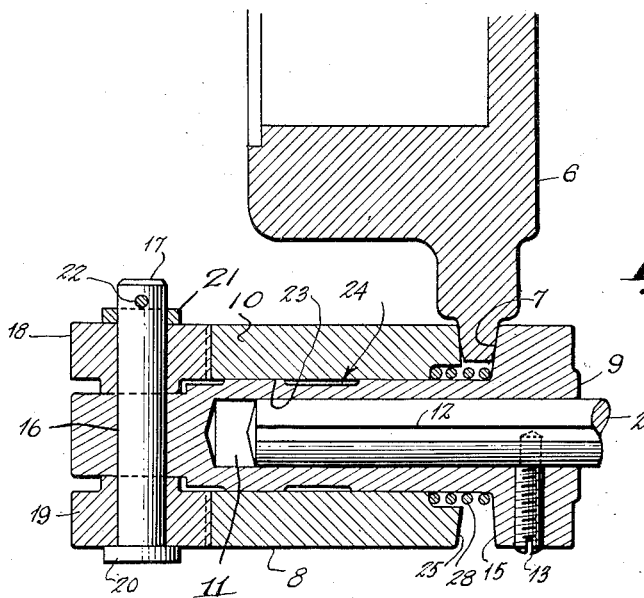
Figure 4 is similar to Figure 3, except that the gripping mechanism is shown in engagement.

Figures 3 and 4 illustrate the starter mechanism, Figure 3 exhibiting the jaws of the gripping mechanism as open, and Figure 4 showing the same as closed. This device embodies two essential elements which are characterized as sleeves. One of said sleeves is designated as 9 and the other as 10. The sleeve 9 is bored axially as at 11 to be run on the motor shaft 2 and to be keyed thereto to partake of the rotary motion thereof as by means of a key slot 12, so that said sleeve 9 may have an axial movement on the shaft 2, as shown in Figure 11. In the specific instance where an electric motor is used, it may be preferable to lock said sleeve 9 to the shaft 2 by a suitable screw as 13, as shown in Figures 3 and 4 as there is sufficient end play in the armature shaft of an electric motor to allow of proper operation of the device. Thus the sleeve 9 may be mounted to either slide longitudinally on the shaft, or said sleeve 9 may be locked to the shaft by the screw 13 as stated, to axially move with the shaft. These arrangements are optional, as stated, and are mechanical equivalents within the purview of this invention. Where the sleeve 9 is locked to the shaft 2 by such a screw 13, it is possible to utilize the thrust of the armature shaft to cause one face of the gripping mechanism to be brought into juxtaposition with one face of the driven element, but under normal conditions it is desirable that the sleeve 9 be free to move axially of the shaft 2. The sleeve 9 at one end has an annular enlargement 14. This enlargement is provided with a face 15, which is one of the cooperative faces of the gripping mechanism hereinafter referred to. At the opposite end of said sleeve 9 is provided an aperture 16 adapted to receive a shaft 17 on which are mounted rollers 18 and 19, the same being held in position by the boss 20 and washer 21 and cotter pin 22. The external periphery of the sleeve 9 forms a bearing surface 23. The sleeve 10 is axially bored, presenting an internal surface 24, to fit on the exterior bearing surface 23 of the sleeve 9; said sleeve 10 is provided at one end with a gripping surface as 25, which is oppositely disposed to the gripping surface 15 of the sleeve 9. The end of said sleeve 10, opposite to that having said gripping surface 25, is provided with two oppositely disposed helical cam surfaces designated as 26, 26. Intermediate the termini of the said cam surfaces are provided indentures 27, 27. The rollers 18 and 19 are adapted normally to rest within the indentures 27 and 27, and to roll respectively on said cam surfaces 26, 26. The sleeve 10 is free to rotate on its said bearing 23 and also free to move axially on said bearing. Elastic means, as a spring 28, is interposed between said sleeves 9 and 10 with its tension normally directed to keep the oppositely disposed jaws 15 and 25 separated. The sleeve 10 is constructed of sufficient weight and volume to normally present within itself an inertia opposed to any active force tending to rotate the same, as for instance, the friction of the said sleeve 10 on its bearing 23, or the tendency to rotate the same due to the operation of the rollers 18 and 19 moving on said cam surfaces 26, 26, or as opposed to any other active force tending to rotate the same, as for instance its contact with the spring 28.

The inherent inertia of said sleeve 10 is deemed to be of importance in the operation of the elements hereinafter described as cooperating to accomplish the result desired, for it is essential that said sleeve 10 should momentarily remain stationary while the rollers are riding on the cams to impart an axial movement to the said sleeve.

Concerning the gripping jaws or surfaces 15 and 25, it is found desirable that these faces should be in conical form at an angle of approximately 3° to the axis of said sleeves. Satisfactory results have been attained under these conditions, but it is not regarded as essential that they should be of conical form; they may be parallel. Where they are of conical form, it is desirable that the engaging periphery 7 of the fly-wheel 6 should be cut at a corresponding angle, as illustrated in Figure 8. In this figure a construction is shown wherein a point of contact is established in the arc of a circle as at 29. It is deemed desirable that such point of contact be restricted within narrow limitations, but it is essential that the oppositely disposed planes of the gripping faces 15 and 25 should be in corresponding parallel planes with the driven faces of the periphery of the driven wheel in order that satisfactory gripping surfaces may be presented to the gripping and confined elements.

With respect to the cam surfaces 26 and 26, and their relation to the rollers 18 and 19 and the stud 17 in the construction shown the best results have been attained when the helical cam surfaces are cut at an angle of 7° to a plane perpendicular to the axis of said sleeve 10, but it is desirable that the relation of the said cam surfaces to the size of the rollers 18 and 19 and to the size of the stud 17 should be such that the degree of pressure exerted by the stud and rollers on the cams as constituted in the construction shown should be equal to the operation of said rollers and stud on a cam cut at an angle of 7°. It will be understood that the same results will be obtained if the rollers and studs were of different diameter and the cams cut at a different angle. It is only desired here to point out this possible variation, and it is only intended to convey the idea that under the construction shown in the drawings which are to scale a 7° cam operates with the most desirable efficiency; but as previously stated, the same desirable efficiency may be obtained by varying the relation of the stud, the rollers, and angle of the cams. The operation of the device therefore has been found to be most efficient under the conditions named. The law of the relation of these parts is described with the purpose of including variations of said angle and said cams and the relation of the rollers and stud as equivalent structures.

In like manner, it will be understood that while in the construction shown the rollers are carried by the sleeve 9, they might with the same efficiency be carried by the sleeve 10, and the cams form part of the structure of the sleeve 9.

For the purpose of graphically illustrating the position of the rollers with reference to the cams of Figure 6, the cams have been laid out in a plane showing the rollers in cooperation therewith. From this drawing it will be seen that the rollers normally rest in the seat 27 and with the rotation of the driving shaft they are rolled upwardly on the cams 26. The diagram shows one complete cam, whereas the other cam is divided into two sections.

The operation of the device is as follows: When the circuit 4 is closed by the operation of the switch 5 the motor is caused to rotate, and if the thrust of the motor shaft is employed as previously stated in the operation of the device the sleeve 9 is axially moved towards the face 7 of the periphery of the fly-wheel. The rotation of said shaft 2 causes the sleeve 9 to rotate, carrying with it the rollers 18 and 19, which immediately begin to ride on the cams 26. The inherent inertia of the sleeve 10 resists momentarily the friction occasioned by the rotation of its bearing, and also the tendency to rotate said sleeve, due to the fact that the rollers are advancing on the cams, thus retarding the movement of the sleeve 10 so that the rollers will have time to advance on said cams. As the rollers advance on the cams, they first rise out of their seat 29, and then proceed along the path of said cams to a point adjacent the termini of such cams. This operation causes the sleeve 10 to be moved axially on its bearing, and also tends to cause the sleeve 9 to move axially on its bearing, the two movements being oppositely disposed, said latter movements causing said gripping faces 15 and 25 to approach each the other, and to grip between them the side walls of the periphery 7 of the fly-wheel 6, thus establishing a gripping relation between said peripheral extension 7 and such gripping faces 15 and 25. Under such conditions the driving element receiving its torque from the electric motor causes the driven element, to wit, the fly-wheel 6, to partake of said motion and revolve therewith, thus imparting motion to the internal combustion engine with which said fly-wheel is associated, and causing the cycle of movement within said engine in the usual manner, hence driving the fly-wheel 6 by the independent power of the combustion engine and normally at a rate of speed greatly in excess of that imparted by the electric motor when operating as the driving element. Hence the velocity of the fly-wheel 6 is greater than that of the gripping faces 15 and 25, and this operation causes the gripping faces 15 and 25 to retrograde. Hence in like manner the rollers retrograde on the cams and the spring 28 causes the gripping faces 15 and 25 to separate, thus accomplishing a release of the primary driving element from the primary driven element when the primary driven element is driven at a greater rate of speed than that which is imparted to the primary driving element.

The releasing operation last described may be detailed as follows. With the start of the apparatus the driven element, to wit, the flywheel, presents an inherent inertia, the same being at rest. When the gripping operation is accomplished by the rotation of the prime motor, and the rolling of the rollers on the cams, said driven element is clamped between the gripping faces 15 and 25. The torque of the electric motor is therefore directed first to accomplish said clamping operation, then to overcome the inertia of said driven wheel, and to rotate the same. When the combustion engine starts to operate, the fly-wheel first loses its inherent inertia and falls into the power of the combustion engine, from which it receives sufficient rotary force to cause the same to rotate at a rate of speed greater than that imparted to the same by the prime mover. Hence the primary resistance to the operation of the prime mover, which is primarily presented by the inertia of said fly-wheel, is eliminated. Hence the torque of the prime mover has nothing to oppose its rotation, and in like manner the rollers operating on the cams have nothing to cause the same to rise on said cams. Hence the gripping operation which is due to the fact that said rollers rise on said cams is instantaneously released. Furthermore, any frictional relation that may exist between the face 25 of the sleeve 10 and the opposed face of the driven element 7 will cause said sleeve 10 to rotate with said driven element more rapidly than the rotation of the sleeve 9. Hence it will be seen that the rotation of the sleeve 10 in the direction imparted thereto by the rapid rotation of the fly-wheel will cause the sleeve 10 to rotate in the same direction as the rotation of the fly-wheel, thus causing the cams carried by the sleeve 10 to voluntarily retract from their relation to their corresponding rollers, thus accomplishing the separation of said gripping faces 15 and 25.

It will be understood that these operations are coincident and the change from the gripping to the releasing relation is instantaneous and can only be apprehended by an analysis of the various functions of the several elements which coordinate to accomplish said release.

It will also be understood that when the primary sleeve 9 is secured to the armature shaft 2 of an electric motor, the spring 3, shown in Figure 1 of the drawings, will normally hold the shaft in a position to disengage the face 15 of the primary sleeve from the part 7 of the fly wheel. When the motor is energized, there is a tendency of the shaft to impel the face 15 into driving engagement with part 7, as stated. This is made possible by the floating character of the shaft due to the end play allowance of said shaft. This force is however negligible as compared to the dominating force resulting from the cooperation of the rollers 18 and 19 with the cam faces 26 which serves to positively draw together both of the faces 15 and 25 into tight gripping relation with the part 7 in order that the fly wheel may be driven as described. Therefore, this preliminary utilization of the thrust of the armature shaft is merely incidental to the operation of the mechanism and will be subservient to said dominant force as stated.

In order that the theory on which this device is constructed, and the forces employed which cause it to operate may be more clearly understood, diagrammatic views 9 and 10 are submitted. While it will be apparent that no diagrammatic views can possibly illustrate all of the functions of this device, these, it is hoped, will be helpful in understanding the principles involved.

It is suggested that the elements exhibited in these diagrammatic views, Figures 9 and 10, be considered as movably mounted on a plane surface. Let 30 represent a bifurcated element having two legs, 31 and 32. 33 represents a surface, while 34 is a roller mounted on the spindle 35. 36 is a wedge shaped element having an angular face 37, and another face 38 parallel with the face 33. 6$^b$ is a driven element having a head 7$^b$, which head is interposed between the faces 33 and 38. In Figure 9, the mechanism is exhibited as open, whereas in Figure 10 it is exhibited as closed. The wedge element 36 and the driven element 6$^b$ are stationary, whereas the bifurcated element 30 is movable. With the advance of the bifurcated element in the direction of the arrow, the roller 34 will advance on the angular face 37 until it arrives at a point on said angular face where positive pressure will be exerted in the line 36$^a$. It will thus be noted that when the mechanism arrives in the position shown in Figure 10, an absolutely positive force is directed in the line 36$^a$ to grip the element 7$^b$ between the walls 33 and 38.

A contemplation of the foregoing will no doubt stimulate a realization that the driving connection accomplished herein is different in its fundamental characteristics from an ordinary friction drive, for the reason that the forces directed in the plane 36$^a$ are absolute and positive and generate such a degree of compression as to lift the invention out of the field of friction engaging elements to bring the same into a class having a gripping function far beyond that which can be accomplished by any of the well known friction devices. In other words, the compression is such as to cause a molecular engagement of a unique and peculiar character between the driving and the driven faces, which is sufficient to eliminate all surface disturbances incident to frictional engagement, such as the presence of oil or any other foreign substance interposed between such faces.

Referring to Figure 11, a second form of construction of the gripping faces is illustrated. Instead of the cam surfaces 15 and 25 illustrated in Figures 3 and 4, gripping faces may be employed in the form indicated at 140. These faces may be conical in their relation, or parallel, without departing from the spirit of the invention, as previously stated. The driven element 141 in this instance is provided with a peripheral tire as 142, or the same may be integral with the driven element 141, and the edges of this tire 142 are formed at a corresponding angle to the angle of the gripping faces 140. These surfaces are designated as 143, 143, and possibly much may be found in this form of construction, due to the fact that said faces may be ground and hardened in a way to cooperate with greater efficiency. A variety of forms of construction of this nature will be obvious."

The following additional drawings are supplied for the purposes of this case, in which the several parts are designated by numerals, like numerals referring to like parts. The differences in structure and operation will be pointed out as we proceed.

Figure 12 is an elevation of the starter as associated with the fly-wheel.

Figure 13 is an end view of the starter.

Figure 14 is a detail in perspective.

Figure 15 is a development of the cams in association with the rollers in their initial relation.

Figure 16 is a view of the position of the development of the cams, when the rollers have traveled to their extreme limit, as shown in dotted lines.

Figure 17 is an elevation showing an end view of the sleeve 10 and the cams as formed on one end thereof in operative association with the rollers, one end of the sleeve 9 being in section for the purposes of this illustration.

Figure 18 is a side elevation of the sleeve 10 with the cams exhibited at the end thereof.

Figure 19 is a vertical section of Figure 12 exhibiting the starter as disengaged from the flange ring of the fly-wheel.

Figure 20 is the same as Figure 19, exhibiting the starter as engaged in a position to drive the fly-wheel.

Figure 21 shows structure such as exhibited in Figures 12 to 20, inclusive, with the exception that the primary sleeve is mounted for axial movement with respect to the shaft of the starting motor. This figure shows the parts partly in central section and partly in elevation.

In describing these said figures, from 12 to 21, inclusive, the same reference numerals have been employed as appear in the drawings of the said pending case, so far as they are applicable. Additional designating numerals indicate the modified constructions which are the subject matter of this application.

In the pending application, 6 indicated a fly-wheel, while 7 designated a flange homogeneous with said fly-wheel. One of the features of this improvement on said structure resides in the fact that said flange 7 is made in the form of an annulus, preferably of hardened steel, the same being indicated in said supplemental drawings as $7^a$. The peripheral bearing surfaces of this ring are intended to be substantially as indicated at 29 in Figure 8.

In this construction, the fly-wheel 6 is preferably provided with a boss as at 134, adapted to receive said annulus $7^a$. This annulus may be shrunk on to the fly-wheel 6, or it may rest in said boss 134 and be secured therein by a plurality of clamps as 135, held in position by screws 136, the latter being screwed into the boss 134 of the fly-wheel. It is found desirable to form this annulus $7^a$ of steel, case-hardened in a manner well known in the art; said annulus is intended to be engaged by the conical surfaces 15 and 25, as previously described.

The following is a description of a further improvement intended to accomplish a dual result,—first, to provide an adjustment which will regulate the distance between the cone faces 15 and 25, together with the degree of resiliency employed, and second, to provide a stop or detent to limit the movement of the rollers on the cams, so that when said rollers, in the operation of the mechanism, arrive at a prescribed point, their movement is arrested and can proceed no further.

With respect to said cam surfaces, in the original application Figure 6 exhibited a plan showing the nature of the cams. In the present application Figures 15 and 16 exhibit the cams with the improvement contemplated herein, to wit, means for limiting the movement of the rollers on the cams, and also means to adjust the relation of the rollers with respect to the sleeve 10, and cam surfaces carried thereby, and hence the relation between the gripping cone faces 15 and 25. Comparing Figure 6 with Figures 15 and 16, it will be noted that the cam 26, instead of continuing in one helical path, is caused to rise abruptly as indicated at 39, such elevation being preferably in the same arc as the periphery of the rollers 18 and 19. In Figure 16 an attempt is made to show in dotted lines the relation between the rollers 18 and 19 and the cam referred to, when the rollers 18 and 19 are forced against the cam surfaces of the sleeve 10. This dotted line is designated as 40. The elevation of the cam surface is exhibited at 39 in Figure 18.

Referring to Figures 19 and 21, an improved construction is exhibited by which an adjustment of the relation between the cone faces 15 and 25 may be regulated, as well as a relation between the rollers 18 and 19 and the cam surfaces 26 and 39 in order that a predetermined degree of pressure may be exerted upon the annulus 7ª, thus determining also the degree of resiliency employed in the operation of the device.

This construction differs from that of the pending case in the following particulars. In the pending case, the bolt 17 passes through the aperture 16 in the sleeve 9, and carries at either end thereof the rollers 18 and 19. In this improved construction the sleeve 9 is cross-axially slotted with an aperture 41 into which the shaft 17ª exhibited in perspective in Figure 14 is introduced. It will be noted that this shaft has a central square section 42, which is mounted with a sliding fit within said slot 41. The rollers 18 and 19 are mounted on the ends of the shaft and suitably secured thereto, as previously stated. Said aperture 41 is formed of sufficient length, measured axially of the sleeve 9, to permit a movement of the said shaft 17ª in the line of said axis. The sleeve 9 is bored axially as at 43 to receive a helical spring 44, said spring having a bearing at one end of the said aperture 43, and at the other end a bearing on one of the square surfaces 42 of the shaft 17ª, as exhibited in Figures 19 and 20. The sleeve 9 is further axially bored and screw-threaded, as at 45, the same being adapted to receive a screw 46.

The operation of this regulating device is as follows. When the screw 46 is screwed against the shaft 17ª, it forces the same to compress the spring 44, which is pressed by the operation of the screw, so that said shaft 17ª is held in firm relation between said screw and said spring 44. The movement of said screw 46, operating as stated, serves to project the shaft 17ª and the rollers 18 and 19 carried thereby against the cam surfaces, as exhibited in said Figures 15 and 16. When at rest and in operative relation, said rollers and cam surfaces lie as indicated in Figure 15. When, however, it is desired to increase the pressure on the annulus 7ª lying between the conical faces 15 and 25, and incidentally to narrow the relation between said faces, the screw 46 is rotated to move the shaft 17ª axially of the sleeve 9, and a greater or less degree of pressure may be thus established between the rollers, the cam surfaces, and the conical faces, thus making a greater or less degree of pressure, and therefore a greater or less grip by the cone faces on the annulus 7ª.

When a degree of pressure desired is once established between the relative parts, said relation may remain fixed indefinitely, or the mechanism may be tightened or loosened by means of the screw 46, as the circumstances of its operation require.

With respect to the abutment 39, provided as a detent, wall, or means for limiting the movement of the rollers on the cams, this operates substantially as indicated in the pending application, except for the fact that the rise in the cam surface at the point 39 establishes a point beyond which the rollers may not go. It has been discovered in the operation of the starter that under certain conditions where the cams are as indicated in Figure 6 of said pending case, the rollers will be forced to rise too far on said cam surfaces, occasioning the possibility of a jamming of the driven annulus between the driving conical faces. It is to avoid this possibility and to limit the movement of the rollers that said abrupt elevation of the surface of said cam as illustrated at 39 is provided.

It will be understood that there is a cooperative relation between the elements that go to make up this starter; primarily the conical jaws 15 and 25 must be brought together under a pressure to grip the annulus 7ª with a sufficient degree of pressure to establish a driving relation between such surfaces. This driving force is accomplished by rotating the rollers on the cams. As previously stated, it is desirable that this rotation be limited by some sort of detent as at 39, so that under the violent operation of the driving member, or for any other reason, the rollers will not be permitted to rise beyond a predetermined point on the cams. Again it is important that the relation of the rollers and cams be adjustable to determine how far they shall rise on said cam surfaces under normal conditions, and this quite apart from means heretofore described to finally limit the movement of said rollers on said cams. This is accomplished, as previously stated, by mounting the shaft 17ª between a screw and a spring mechanism operating in a line axial to the sleeve 9, in such a way that the shaft 17ª may be moved in the line of the axis of the said sleeve 9 to accomplish any degree of pressure that may be found to be desirable in connection with the operation of the starter.

Referring to Figures 19 and 20, wherein 1 represents an auxiliary source of power, as an electric motor, for operating the starting mechanism for initiating the rotation of the fly-wheel 6, it is seen that the armature shaft 2 of the motor is provided with an extension which carries the starting mechanism, the same being keyed thereto and located axially by means of the set screw 47. In accordance with the present invention, however, it is not necessary to provide the set screw 47 since, if desired, the primary sleeve 9 may have an axial movement on the shaft 2 of the starting motor as shown in Figure 21, wherein said primary sleeve is shown as having a splined or keyed connection with the shaft to permit the primary sleeve to slide axially upon said shaft. In the drawings herein the armature shaft 2 is shown as provided with a ball bearing 48, the inner race of which 49 is firmly held against the shoulder 50 on the armature shaft by nut 51 threaded upon armature shaft 2. The outer race 52 of said ball bearing is mounted to slide axially within a housing provided for it in the motor end plate 53.

End plate 53 is also provided with the inturned shoulder 54, which furnishes a stop or abutment limiting the axial movement of the starter in one direction, thus establishing the proper clearance between the conical face 15 and the annular ring or flange 7ª. When the starting mechanism is at rest it is always held firmly against shoulder 54 by means of the spring 3 shown in Figure 12. In this manner shoulder 54 acts as a seal to prevent dust or other foreign matter from entering the ball bearing 48.

From the construction shown, wherein the anti-friction bearing is located so near axially to the flange member 7ª and the driving surfaces 15 and 25, the friction due to the thrust on the starting motor shaft is substantially eliminated and the efficiency of the entire mechanism brought to a high degree.

In the operation of the apparatus and in the performance of the method disclosed in the foregoing application for patent, it will be noted that when the starting motor begins to rotate the rollers are caused to move on the cam surfaces, and by such operation they cause the cone surfaces to be drawn each towards the other, thus gripping the sides of a flange or rib projecting from the periphery of the fly-wheel. Under normal conditions it has been observed that when the cams are formed with a suitable angle to a plane perpendicular to the axis of the sleeves, said rollers will function to cause the cones to grip the flange on the fly-wheel as indicated with a suitable degree of pressure, but it has also been noted that under certain abnormal conditions which eventuate from time to time in the operation of the mechanism, the rollers will be caused to travel so far on the cam surfaces as to create an excessive pressure, and under certain conditions may cause the apparatus to momentarily lock against rotation. The reason for this is believed to be that the starting torque of the motor is not always uniform, due to the fact that there may be a greater or less inrush of current through the motor, or it may be that the resistance opposed to the rotation of the driven shaft may be increased for one reason or another, so that between the torque exercised by the motor and the resistance offered by the driven shaft a greater degree of pressure on the rollers may be incident to such operation, causing the same to advance to an abnormal position on the cam surfaces and thus may develop a degree of pressure between the cones, which, to a certain extent, may possibly interfere with the free operation of the mechanism.

In contemplating the foregoing, it is important to take into consideration the fact that the elements employed are freely associated, and have within themselves a certain degree of resiliency so that when the rollers are thus violently operated in association with the cams, there is a certain degree of resiliency or spring action which is subject to compression by the operation of the rollers in connection with the cams, under conditions similar to those above recited, to wit, the excessive torque of the motor as opposed to an excessive resistance of the driven shaft. That is to say, it is important to take into consideration the fact that when in operation a high degree of pressure is developed between the cone surfaces and the fly-wheel flange and that this pressure, while parallel with the axis of the cones, is not in line therewith. This causes a bending stress in the stem of the mechanism which is resisted by the elasticity of the material of which it is constructed, thus producing a veritable spring pressure between the cones and the flange.

The improvement contemplated in the present application has to do with means for limiting the degree of the thrust of the rollers on the cams, in association with means for adjusting the axial thrust of the cone sleeves with respect each to the other,—all of which may be more or less dependent on the axial dimension or thickness of the peripheral flange of the fly-wheel, as indicated in the foregoing application. It also has to do with the control of the resilient or spring quality of the elements as they mutually cooperate in the performance of the results stated in said previous application.

With respect to means for regulating the thrust of the rollers on the cams, it is proposed in this application to vary the contour of the cams substantially as follows. In the previous application the cams were formed with a true helix emanating from a plane perpendicular to the axis of the sleeves. In the present application it is proposed to maintain said true helix of a suitable inclination to a predetermined point, and at that point to alter the form of the cam to a considerably greater angle, such increase to be in the arc of a circle, that is to say, in an arc which would produce a sudden deviation from the true helix, so that when the same is engaged by the rollers such angle of increased inclination will present a cam to the rollers which will cause the same to be arrested in their movement on the cams, and according to the degree of the angle of said increase of the cam surfaces, so the resistance to the rotation of the rollers will be increased, the result being that under the abnormal conditions above described, that is to say, where the torque of the motor is increased as opposed to the resistance of the driven shaft, the rollers will arrive at a point where they can go no further and will be prevented thereby from jamming into the acute angle represented by the inclination of said cams heretofore referred to, to a predetermined point, and beyond that point to alter the form of the cams in a manner to constitute a stop beyond which the rollers cannot travel. A preferred form of the cams as shown in the drawings in this application is to shape the cams in a manner to correspond with the circumference of the driving rollers, and to carry this circular surface to such an elevation as to positively check the movement of the rollers upon the cams. In this manner the pressure existing between the cones and the fly-wheel flange cannot ever exceed a predetermined amount, this amount being made sufficient to drive the fly-wheel against its heaviest resistance with a suitable margin. With this construction all tendency for the rollers to jam is entirely eliminated.

Under the conditions above outlined it has been found desirable to provide means by which the relation of the rollers and the cam surfaces with respect to the intervening space between the cones may be adjusted axially. The second phase of this improvement, therefore, resides in the fact that means are provided by which the axial dimension represented by the space between cones and the relation between the rollers and cams may be manually adjusted so as to bring about a relation of the parts that will at all times be satisfactory, and in making this statement it must be recalled also that there is a certain resiliency or spring action between the elemental parts which is a variable quantity, and it is for the purpose of controlling this spring action and compensating for all of the variants that enter into the adjustment of the mechanism that said adjustable means is provided.

In the construction shown in the above mentioned application for patent, a peripheral annular element of the fly-wheel designated as 7, which is adapted to be engaged by the oppositely disposed cones 15 and 25, is shown in that application as integral with the fly-wheel 6. It has been found desirable to construct this annular flange in a separate piece and to secure the same to the fly-wheel by suitable means. This construction forms one branch of the improvement for which this application is made. The construction last referred to is found desirable for the reason that it is important that said annular flange should be made of steel, the same being preferably case-hardened so as to withstand the intense pressure exerted thereon by the conical faces when the device is in operation.

It will be understood that normally the fly-wheel of an explosive engine is made of cast iron which, while sufficiently hard for certain purposes, is not as satisfactory for the mechanism described herein in operation as a peripheral band formed of steel and hardened to as high a degree as possible. This band may be pressed or shrunk on to a turned portion of the fly-wheel provided therefor, or it may be secured thereto by any suitable means, as heretofore described.

A further phase of the improvement embodied in this application resides in the providing of means by which a certain frictional resistance incident to the operation of said primary apparatus is relieved, thus reducing the power consumption developed in the operation of said device. This may be explained as follows.

It has been observed that when the starter mechanism goes into action, a tendency is developed to force the driving and driven elements in opposite directions, that is to say, to cause such elements to tend to separate one from the other. This tendency, it is believed, is due to the fact that because the cone surfaces diverge and engage the flange on the fly-wheel in that relation, that the path of contact between such driving and driven surfaces tends to cause the contact between them to take a spiral path; hence, as it were, there is a constant tendency in the operation of the apparatus to cause the cones and flange to separate. As such separation is impossible a certain degree of friction is generated, which must be compensated for by either an increase of power or a reduction of friction at the point where the bearing surfaces contact. A solution of the problem is found in the latter expedient, that is to say, the providing of means for reducing the friction at the point where it is transferred to the motor shaft. This is accomplished in practice by mounting the motor shaft in anti-friction bearings such as ball bearings, thus relieving said friction due to said thrust and minimizing the same at a point where such thrust is at its maximum.

The friction loss, due to the movement of the driving cones with respect to the driven ring, is extremely slight due to the hardness of the materials and shape of the parts and their narrow point of contact, but it is found desirable to minimize this as much as possible, hence the employment of said anti-friction bearing as stated. Under such conditions an efficiency comparable with a spur gear is attained, which fact is of value in the art to which this invention appertains.

Claims:

1. In a combustion engine starter, a driving shaft and a driven shaft, two sleeves, one of which is mounted on the driven shaft to be rotated therewith and yet free to move axially of said shaft, the other of said sleeves being mounted on the first mentioned sleeve for rotation and also free to move axially, each of said sleeves provided at corresponding ends thereof with cooperating gripping faces adapted to form together a gripping mechanism, and at the other end thereof provided with actuating mechanism as follows; one of said sleeves being provided with cam surfaces and the other carrying rollers adapted to cooperate with said cam surfaces, said cam surfaces comprising seats for said rollers so constituted that when said rollers are seated therein the gripping faces are separated a maximum distance and cam faces emanating from said seats at a predetermined degree of inclination to a plane perpendicular to the axis of said sleeves, and adapted to cause said gripping faces to grip a driven element interposed between them, and further faces emanating from the point of termination of said last mentioned cam faces, said further faces having a curvature corresponding approximately to the arc of the periphery of said rollers and adapted to operate as a positive stop for said rollers, elastic means interposed between said sleeves to normally hold said cooperating gripping faces spaced apart, a driven element carried by said driven shaft and adapted to be interposed between said gripping faces so that when the driving shaft is operated said rollers cooperate with said cam faces to move said sleeves axially of said driving shaft and cause the said gripping faces to grip said interposed driven element which in the operation of the device will partake of the rotary movement of the driving shaft, until such time as the driven element is caused to rotate with a greater speed than that imparted to the gripping faces, thus operating to cause said cam faces and rolls to retroact the gripping faces to release the driven element.

2. In a combustion engine starter, a driving shaft and a driven shaft, two sleeves, one of which is mounted on the driven shaft to be rotated therewith and yet free to move axially of said shaft, the other of said sleeves being mounted on the first mentioned sleeve for rotation and also free to move axially, each of said sleeves provided at corresponding ends thereof with cooperating gripping faces adapted to form together a gripping mechanism, and at the other end thereof provided with actuating mechanism as follows; one of said sleeves being provided with cam surfaces and the other carrying rollers adapted to cooperate with said cam surfaces, said cam surfaces comprising seats for said rollers so constituted that when said rollers are seated therein the gripping faces are separated a maximum distance and cam faces emanating from said seats at a predetermined degree of inclination to a plane perpendicular to the axis of said sleeves, and adapted to cause said gripping faces to grip a driven element interposed between them, and further faces emanating from the point of termination of said last mentioned cam faces, said further faces having a curvature corresponding approximately to the arc of the periphery of said rollers and adapted to operate as a positive stop for said rollers, elastic means interposed between said sleeves to normally hold said cooperating gripping faces spaced apart, a driven element carried by said driven shaft and adapted to be interposed between said gripping faces so that when the driving shaft is operated said rollers cooperate with said cam faces to move said sleeves axially of said driving shaft and cause the said gripping faces to grip said interposed driven element which in the operation of the device will partake of the rotary movement of the driving shaft until such time as the driven element is caused to rotate with a greater speed than that imparted to the gripping faces, thus operating to cause said cam faces and rolls to retroact the gripping faces to release the driven element, said rollers being mounted as follows at the respective ends of a shaft, said shaft being mounted in a slot in the sleeve carrying said shaft, said shaft being interposed between a spring and a screw so that the position of said shaft is adjustable axially of said sleeve by the movement of said screw.

3. In an assembly of the type described, the combination of an auxiliary source of power, a member rotated thereby, said member being provided with a conical surface and also carrying a cross shaft axially adjustable with reference to said member, said shaft having rollers mounted thereon, a sleeve freely mounted upon said member, said sleeve being provided at one end with cam surfaces adapted to engage said rollers and be actuated thereby, and a conical surface at the other end adjacent and opposed to the conical surface on said first mentioned member, said conical surfaces being adapted to engage a flange upon a driven member interposed between them.

4. In an assembly of the type described, an auxiliary source of power, a member driven by said source of power and having a conical surface, said member carrying a cross shaft adjustable axially upon said member, said shaft being provided with rollers, a sleeve freely mounted upon said member, said sleeve having cam surfaces at one end thereof adapted to be engaged and actuated by said rollers, said cam surfaces having a contour adapted to limit the movement of said rollers in both directions, said sleeve having at the other end a conical surface adjacent and opposed to the conical surface on said member, and a flanged driven member interposed between the conical surfaces and adapted to be engaged and driven by said opposed conical surfaces.

5. In an assembly of the type described, the combination of a member provided with a conical surface, a cross shaft carried by said member and having rollers mounted thereon, a loose sleeve adapted to freely rotate and move axially upon said member, said sleeve having at one end a conical surface adjacent and opposed to the conical surface on said member and at the other end cam surfaces adapted to engage said rollers and be operated thereby, said cam surfaces being formed with a hollow portion for sustaining said rollers in their initial position and acting as a back stop therefor, an inclined portion whereby said sleeve is advanced by said rollers and a stop portion to limit the forward movement of said rollers, and an adjusting member to establish the position of the rollers with respect to said first mentioned member.

6. In an assembly of the type described, the combination of a member provided with a conical surface, a cross shaft carried by said member and having rollers mounted thereon, a loose sleeve adapted to freely rotate and move axially upon said member, said sleeve having at one end a conical surface adjacent and opposed to the conical surface on said member and at the other end cam surfaces adapted to engage said rollers and be operated thereby, said cam surfaces being formed with a hollow portion for sustaining said rollers in their initial position and acting as a back stop therefor, an inclined portion whereby said sleeve is advanced by said rollers and a stop portion to limit the forward movement of said rollers, an adjusting member to establish the position of the rollers with respect to said first mentioned member, and a spring adapted to hold said rollers and said cam surfaces in contact.

7. Power transmission mechanism comprising coaxially positioned primary and secondary gripping elements having opposed gripping faces spaced apart, said elements being mounted for relative rotary and coaxial sliding movement with respect to one another, a cam surface associated with one of the elements and a cooperating cam follower carried by the other element, said cam surface being shaped to impart relative axial movement between the elements when the primary element is rotated faster than the secondary element, for the purpose of shifting the gripping faces into driving engagement with a driven element adapted to be interposed between them and to retract said gripping faces when the secondary element rotates faster than the primary element, a stop to definitely limit the travel of the cam follower on the cam surface to a predetermined degree, means for directly driving the said primary element with relatively rapid acceleration at the commencement of the driving operation, the elements being so associated with one another that the primary gripping element which is directly driven will impart rotary movement to the secondary element, and said secondary element being so constituted that its inertia presents a resistance to said imparted rotary movement sufficient to momentarily retard its movement, whereby the primary element will rotate faster than the secondary element and cause the two elements to be shifted axially to move the gripping faces thereof toward one another and into engagement with the driven element between them, means for axially adjusting the cam follower with respect to the cam surface to regulate the relation between said gripping faces and thus determine the degree of compression exercised by them on the driven element.

8. Power transmission mechanism comprising axially positioned primary and secondary gripping elements having opposed gripping faces spaced apart, said elements being mounted for relative rotary and coaxial sliding movement with respect to one another, a cam surface associated with one of the elements, and cooperating cam following rollers associated with the other element, said cam surface comprising seats for said rollers permitting the gripping faces to separate a maximum dimension, helical cam faces emanating from said seats and advancing at a predetermined degree of inclination and terminating in cam faces having an abrupt curvature corresponding approximately to the arc of the periphery of said rollers and serving as a stop against the further advance of said rollers on the cam faces, said first mentioned cam faces being shaped to impart relative axial movement between the elements when the primary element is rotated faster than the secondary element for the purpose of shifting the gripping faces into driving engagement with a driven element adapted to be interposed between them and to retract the gripping faces when the secondary element rotates faster than the primary element, means for directly driving the primary element with relatively rapid acceleration at the commencement of the driving operation, the elements being so associated with one another that the primary gripping element which is directly driven will impart rotary movement to the second gripping element, and said secondary element being so constituted that its inertia presents a resistance to said imparted rotary movement sufficient to momentarily retard its movement, whereby the primary element will rotate faster than the secondary element and cause the two elements to be shifted axially to move the gripping faces thereof toward one another and into engagement with the driven element between them, and means for axially adjusting the cam following rollers with respect to the cam surface to regulate the relation between said gripping faces and thus determine the degree of compression exercised by them on the driven element.

9. Power transmission mechanism comprising primary and secondary elements, the primary element of which is adapted to be directly driven and the secondary element of which is mounted on the primary element for relative rotary and coaxial sliding movement thereon, said elements being both provided on corresponding ends with cooperating gripping faces spaced apart, a cam surface associated with the secondary element and the primary element being cross axially slotted, a shaft extending cross axially through said slot, rollers mounted for rotation on the shaft and adapted to cooperate with the cam surface of the secondary element, a screw extending axially from one end of the primary element into the slot thereof and bearing against the shaft to adjust the rollers with respect to the cam surface, and a spring acting against the opposite side of the shaft to hold it against the screw, said cam surface being shaped to force the elements axially with respect to one another to move the gripping of faces toward one another when the primary element rotates faster than the secondary element and to permit of the separation of said gripping faces when the secondary element rotates faster than the primary element, means for directly driving the said primary element with relatively rapid acceleration at the commencement of the driving operation, whereby the rotary movement of the primary element will impart rotary movement to the secondary element, said secondary element being so constituted that its inertia will present a resistance to said imparted rotary movement sufficiently to momentarily retard its movement, so that the primary element will rotate faster than the secondary element and cause the two elements to be shifted axially to move the gripping faces toward one another and into engagement with a suitable annular member adapted to be positioned between them and to be driven by them.

10. Power transmission mechanism comprising primary and secondary elements, the primary element of which is adapted to be directly driven and the secondary element of which is mounted on the primary element for relative rotary and coaxial sliding movement thereon, said elements being both provided on corresponding ends with cooperating gripping faces spaced apart, a cam surface associated with the secondary element and the primary element being cross axially slotted, a shaft extending cross axially through said slot, rollers mounted for rotation on the shaft and adapted to cooperate with the cam surface of the secondary element, a screw extending axially from one end of the primary element into the slot thereof and bearing against the shaft to adjust the rollers with respect to the cam surface, and a spring acting against the opposite side of the shaft to hold it against the screw, said cam surface embodying cam faces shaped to force the elements axially with respect to one another to move the gripping faces toward one another when the primary element rotates faster than the secondary element and to permit of the separation of said gripping faces when the secondary element rotates faster than the primary element, means for directly driving the said primary element with relatively rapid acceleration at the commencement of the driving operation, whereby the rotary movement of the primary element will impart rotary movement to the secondary element, said secondary element being so constituted that its inertia will present a resistance to said imparted rotary movement sufficiently to momentarily retard its movement, so that the primary element will rotate faster than the secondary element and cause the two elements to be shifted axially to move the gripping faces toward one another and into engagement with a suitable annular member adapted to be positioned between them and to be driven by them, the cam surface of the secondary element comprising seats for said rollers permitting the gripping faces to separate a maximum dimension, with said cam faces emanating from said seats and advancing at a predetermined degree of inclination with each of said cam faces terminating in a relatively abrupt cam face having a curvature corresponding approximately to the arc of the periphery of said rollers and serving as a stop to the advancement of the roller on the corresponding cam face.

11. In a power transmission and engine starter device, constituted as described, means bearing a gripping surface and cam surfaces, means bearing another gripping surface and rollers, said cam surfaces and rollers being adapted for cooperation and each of said cam surfaces having a predetermined inclination adapted to be traversed by one of the rollers and merging into an increase in cam inclination sufficient to definitely arrest the movement of the cooperating roller.

12. In an assembly of the type described, a sleeve bearing a gripping surface and cam surfaces, a second sleeve bearing another gripping surface and rollers, the first sleeve being provided adjacent the point of departure of each of said cam surfaces with a depression adapted to receive one of the rollers, and each of said cam surfaces having a predetermined inclination adapted to be traversed by one of the rollers and merging into an increase in cam inclination sufficient to definitely arrest the movement of the cooperating roller.

Signed by me at New York city this 17th day of July, 1928.

ALEXANDER DOW.